United States Patent [19]
Wiener

[11] Patent Number: 5,029,093
[45] Date of Patent: Jul. 2, 1991

[54] DUAL REDUNDANT ELECTRONIC POSTAGE METER

[75] Inventor: Patricia P. Wiener, La Honda, Calif.

[73] Assignee: Pitney Bowes Inc., Stamford, Conn.

[21] Appl. No.: 554,944

[22] Filed: Jul. 16, 1990

Related U.S. Application Data

[63] Continuation of Ser. No. 787,348, Oct. 15, 1985, abandoned.

[51] Int. Cl.⁵ .............................................. G07B 17/00
[52] U.S. Cl. ................................ 364/464.02; 371/9.1
[58] Field of Search ... 364/464, 466, 200, 900 MS File, 364/464.02; 371/9, 10, 67, 9.1, 9

[56] References Cited

U.S. PATENT DOCUMENTS

| | | | |
|---|---|---|---|
| 3,938,095 | 2/1976 | Check, Jr. et al. | 364/900 |
| 3,978,457 | 8/1976 | Check, Jr. et al. | 364/200 |
| 4,101,958 | 7/1978 | Patterson et al. | 364/200 |
| 4,191,996 | 3/1980 | Chesley | 371/9 X |
| 4,301,507 | 11/1981 | Soderberg et al. | 364/464 |
| 4,358,823 | 11/1982 | McDonald et al. | |
| 4,371,754 | 2/1983 | De et al. | 371/10 X |
| 4,377,000 | 3/1983 | Staab | 371/11 |
| 4,422,148 | 12/1983 | Soderberg et al. | 364/900 |
| 4,471,441 | 9/1984 | Check, Jr. | 364/466 |
| 4,481,604 | 11/1984 | Gilheim et al. | 364/900 |
| 4,484,307 | 11/1984 | Quatse et al. | 364/400 |
| 4,566,106 | 1/1986 | Check, Jr. | 371/67 |
| 4,579,054 | 4/1986 | Buan et al. | 101/78 X |
| 4,627,016 | 12/1986 | Kirschner et al. | 364/900 MS |
| 4,654,819 | 3/1987 | Stiffler et al. | 364/900 |
| 4,654,846 | 3/1987 | Goodwin et al. | 371/9 X |

FOREIGN PATENT DOCUMENTS

| | | |
|---|---|---|
| 0019515 | 11/1980 | European Pat. Off. |
| 0085385 | 1/1983 | European Pat. Off. |
| 0081238 | 6/1983 | European Pat. Off. |
| 2104267 | 3/1983 | United Kingdom |

*Primary Examiner*—Parshotam S. Lall
*Assistant Examiner*—Edward R. Cosimano
*Attorney, Agent, or Firm*—Charles G. Parks, Jr.; David E. Pitchenik; Melvin J. Scolnick

[57] ABSTRACT

A dual redundant electronic postage meter and associated method is provided for increasing the reliability of meter operation, comprising a first meter module including triple redundant memory technique/dual redundant means and dual redundant microprocessor means, a second meter module including triple redundant techniques/dual redundant memory means and dual redundant microprocessor means, the dual redundant microprocessor means of the first meter module selectively communicating with a data entry means and external output means, and the dual redundant microprocessor means of the second meter module selectively communicating with the data entry means and the external output means, the second meter module being activated in response to a failure in the operation of the first meter module.

33 Claims, 8 Drawing Sheets

FIG. 6
ACCOUNTING PROCESS START PER TRANSACTION SWITCHING CRITERIA

DUAL REDUNDANT ELECTRONIC POSTAGE METER

This application is a continuation of application Ser. No. 787,348, filed 10/15/85 now abandoned.

BACKGROUND OF THE INVENTION

The present invention relates to electronic postage meters, and more particularly to a dual redundant electronic postage meter for increasing the reliability of the meter operation.

Various electronic postage meter systems have been developed, see for example, the systems disclosed in U.S. Pat. No. 3,978,457 for Microcomputerized Electronic Postage Meter Systems, U.S. Pat. No. 3,938,095 for Computer Responsive Postage Meter, European Patent Application 80400603.9, filed May 5, 1980, for Electronic Postage Meter Having Improved Security and Fault Tolerance Features, U.S. Pat. No. 4,301,507, for Electronic Postage Meter Having Plural Computing Systems, and co-pending application Ser. No. 447,815, filed Dec. 8, 1982, for Stand-Alone Electronic Mailing Machine, now U.S. Pat. No. 4,579,054.

Generally electronic postage meters include some form of non-volatile memory capability to store critical postage accounting information. This information includes, for example, the amount of postage remaining in the meter for subsequent printing and the total amount of postage already printed by the meter. Other types of accounting or operating data may also be stored in the non-volatile memory, as desired.

However, conditions can occur in electronic postage meters where information stored in non-volatile memory may be lost. A total line power failure or fluctuation in voltage conditions can cause the microprocessor associated with the meter to operate erratically and either cause erasure of data or the writing of spurious data in the non-volatile memory. The erasure of data or the writing of spurious data in the non-volatile memory result in a loss of critical accounting information. Since the accounting data changes with the printing of postage and is not permanently stored elsewhere, there is no way to recapture or reconstruct the lost accounting information. Under such circumstances, it is possible that a user may suffer a loss of postage funds.

To minimize the likelihood of a loss of information stored in the non-volatile memory, various approaches have been adopted to insure the high reliability of electronic postage meters. It is known from aforementioned U.S. Pat. No. 3,978,457 and aforementioned co-pending application Ser. No. 447,815, now U.S. Pat. No. 4,579,054 to provide a microprocessor controlled electronic postage meter having memory architecture which includes a temporary storage memory for storing accounting data reflecting each meter transaction and a non-volatile memory to which the accounting data is transferred during the power down cycle of the meter.

Another approach for preserving the stored accounting data has been the use of redundant non-volatile memories. One such redundant memory system is disclosed in patent application Ser. No. 343,877, filed Jan. 29, 1982, in the name of Frank T. Check, Jr., and entitled Electronic Postage Meter Having Redundant Memory, now abandoned in favor of application Ser. No. 723,001, filed Apr. 15, 1985 which issued on Jan. 21, 1986 as U.S. Pat. No. 4,566,106. With such redundant memory system the two redundant non-volatile memories are interconnected with a microprocessor by way of completely separate data and address lines to eliminate error conditions. The data stored in each memory is the same, although the data may be stored in a different form in each memory, e.g., it may be coded. The data is applied to the memories simultaneously or sequentially at different times during the postage transactions.

Another redundant memory system is disclosed in the aforementioned European Patent Application 80400603.9. In such patent application, the same accounting data is written into each of the two non-volatile memories, designated BAMs, by updating the specific registers of the BAMs twice during each postage meter transaction, once in temporary form and once in permanent form to minimize the loss of accounting data during microprocessor failure.

Pending patent application Ser. No. 643,113 filed Aug. 22, 1984 and entitled, Electronic Postage Meter Having Multiple Non-Volatile Memories For Storing Different Historical Information Reflecting Postage Transactions, now U.S. Pat. No. 4,731,749, disclosed a first non-volatile memory having cumulative historical information of postage transactions written therein during the power down cycle of the meter and a second non-volatile memory having a greater data storage capacity than the first non-volatile memory for sequentially writing historical information regarding each trip cycle of the meter in a different address in the second non-volatile memory in real time as each postage transaction occurs so that two different records of historical information regarding the postage transactions are provided.

Pending patent application Ser. No. 643,112 filed on Aug. 22, 1984, and entitled Memory Address Location System For An Electronic Postage Meter Having Multiple Non-Volatile Memories, now U.S. Pat. No. 4,627,016, discloses a non-volatile memory for storing data in which data is used to locate the next memory address in which to write data in another non-volatile memory.

However, although the aforementioned systems have contributed to increased meter reliability, occasions may occur during meter operation when it is desirable to provide increased meter reliability. For example, if there is microprocessor failure and/or a failure of both NVMs.

This invention deals both with the primary function "accounting" arithmetic process, and data storage by providing for redundant microprocessors and memory means. The methodology described allows for detecting and locating source of critical process and data storage errors. Consequently dual redundancy within a module and dual redundant modules provides a significant increase in meter reliability.

SUMMARY OF THE INVENTION

It is an object of the present invention to provide an ultra-reliable dual redundant electronic postage meter.

It is a further object of the present invention to provide an ultra-reliable dual redundant electronic postage meter which facilitates serviceability and minimizes any possible loss of funds.

It is a further object of the present invention to provide an ultra-reliable dual redundant electronic postage meter in which the control, accounting and printing functions are combined in an integrated circuit.

It is a further object of the present invention to provide an ultra-reliable electronic postage meter employing triple redundancy techniques for decision making.

It is a further object of the present invention to provide an ultra-reliable electronic postage meter for verifying the positional accuracy of the printwheels.

It is a still further object of the present invention to provide an ultra-reliable electronic postage meter with an event based error detection system.

It is a still further object of the present invention to provide an ultra-reliable electronic postage meter with real time control of the meter accounting functions.

It is a still further object of the present invention to provide an ultra-reliable electronic postage meter in which the memory is organized on a byte basis.

It is a still further object of the present invention to provide an ultra-reliable electronic postage meter for storing retry and switch flags in memory.

It is a still further object of the present invention to provide an ultra-reliable electronic postage meter with dual segmented ROMs.

It is a still further object of the present invention to provide an ultra-reliable electronic postage meter having dual redundant memories which are address partitioned.

It is a still further object of the present invention to provide an ultra-reliable electronic postage meter in which error detection, location and retry is utilized for error correction and decision making. Retry occurs either for a primary or secondary event.

It is a still further object of the present invention to provide an ultra-reliable electronic postage meter in which the control sum is retrieved only once, during power up of the meter.

It is a still further object of the present invention to provide an ultra reliable electronic postage meter having various instructions for certain defined errors.

It is a still further object of this invention that error detection/location correction will occur in "real time" during event occurence on a transaction basis, such real time control to include error detection and location.

It is a still further object of the present invention to provide an ultra-reliable electronic postage meter in which errors are corrected under defined conditions to guarantee accuracy in the data reflecting the amount of postage used (AR) and the amount of postage remaining in the meter (DR).

Briefly, in accordance with the present invention, a dual redundant electronic postage meter and associated method is provided for increasing the reliability of an electronic postage meter, comprising a first meter module including dual redundant memory means and dual redundant microprocessor means. This allows for triple redundancy techniques in either error detection, localization and correction. A second meter module including dual redundant memory means and dual redundant microprocessor means, the dual redundant microprocessor means of the first meter module is adapted to be coupled to a data entry means and external output means, and the dual redundant microprocessor means of the second meter module is adapted to be coupled to the data entry means and the external output means with the second meter module being activated in response to a failure in the operation of the first meter module.

Other objects, aspects and advantages of the present invention should be understood from the detailed description considered in conjunction with the drawings, as follows.

DETAILED DESCRIPTION

Figures 1, 1B:
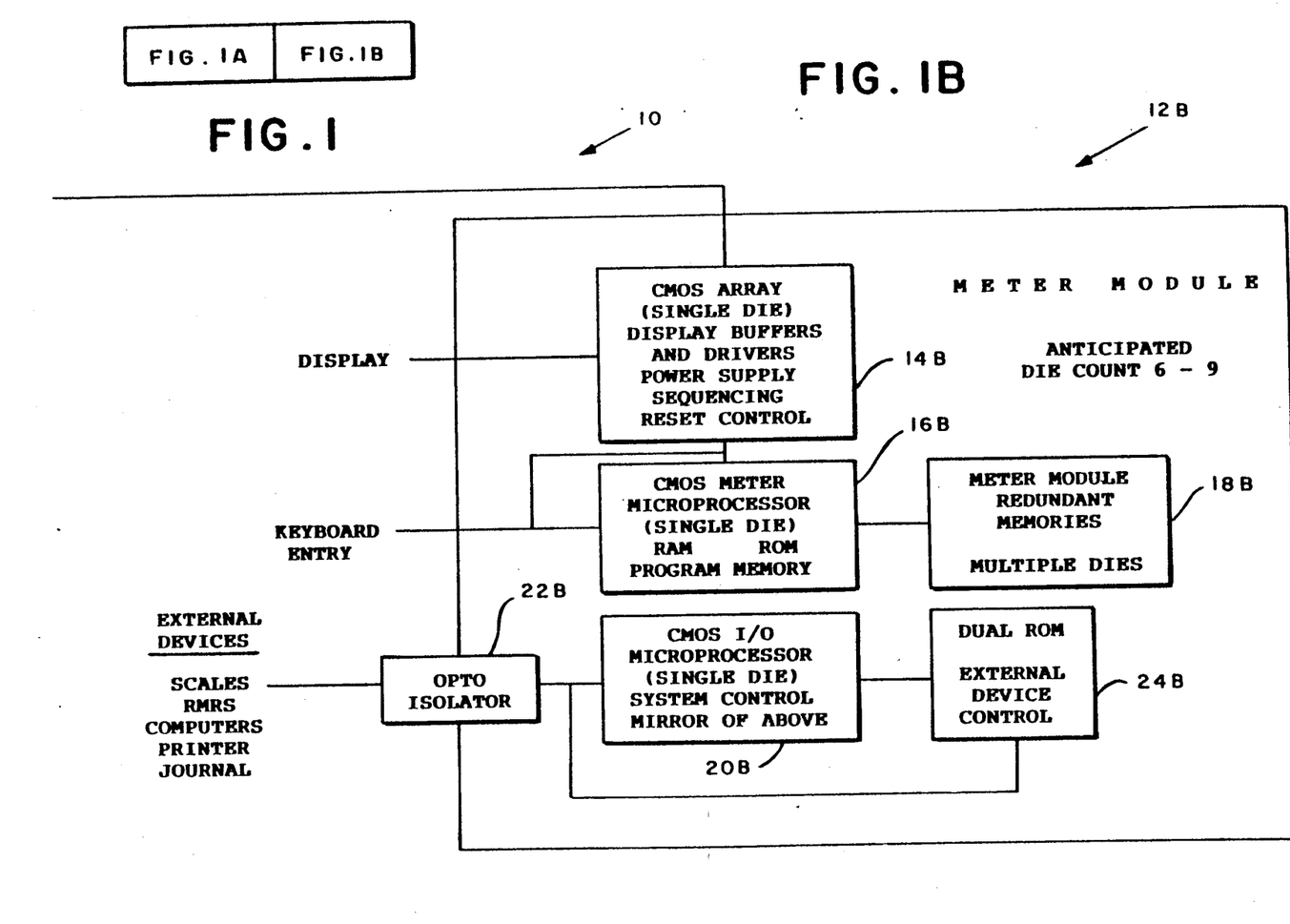
FIGS. 1A and 1B comprise a block diagram illustrating a dual redundant electronic postage meter in accordance with the present invention.
Figure 1A:
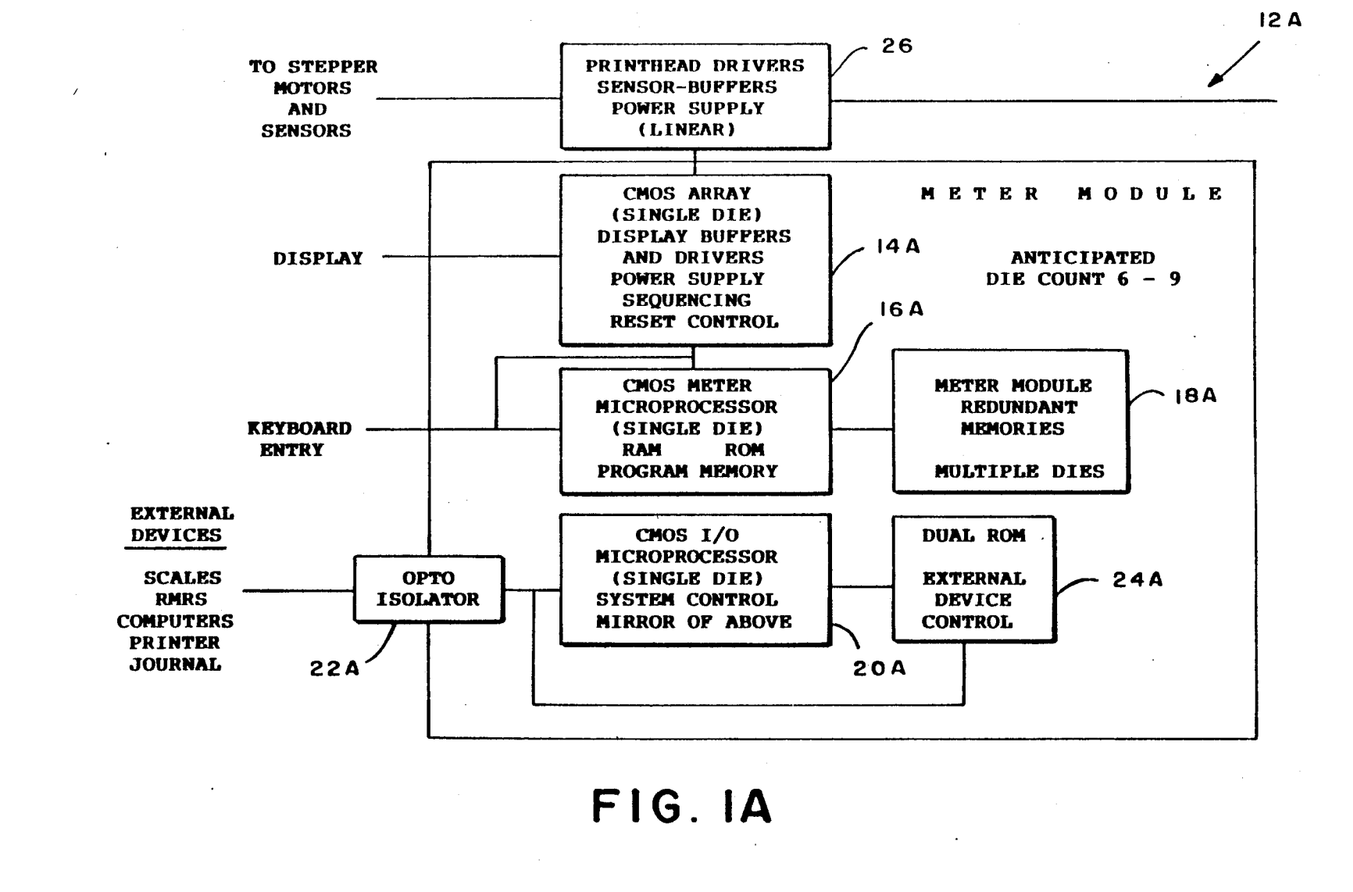

Referring to FIGS. 1A and 1B, a dual redundant electronic postage meter in accordance with the present invention is illustrated generally at 10. The dual redundant electronic postage meter 10 includes a pair of identical meter modules 12A and 12B. Each meter module 12A and 12B includes a CMOS array 14A or 14B which is electrically coupled to display buffers and drivers and a power supply for reset control.

The CMOS processor 16A or B has internal to the microprocessor chip both ROM and RAM. The internal ROM stores programs which enables it to control microprocessor action aritmethic and otherwise, relating to the meter operation. It defines what sequence of action takes place as regards this operation and responses determined by its sensors. It directs accounting operation (address) and data to be stored in the RAM, defines when such data is to be transferred NVM, etc. Redundant NVM memories 18A in module A or 18B in module B store critical accounting information. During power up critical accounting information in NVM transfers to "RAM". Triple redundancy per module —a "RAM" in the microprocessor and multiple BAMs or NVM (2) allow for error localization and detection during power up/down and while power is on during the select, accounting and print phase of meter operation. The methodology enables verification of the ability to proceed to the next instruction (event) during the accounting process and verification of data integrity after arithmetic and print process. Historical data is only updated at power down.

A second CMOS microprocessor 20A or 20B is also part of the meter modules 12A and 12B. This redundant microprocessor is a mirror image of microprocessor 16A or 16B. In addition to the internal ROM which has the same instruction set as 16A or B, it has a dual ROM which could be a segmented on a use basis. This ROM could be a ROM or EPROM, etc. or two ROMs. The dual ROM 24A/B serves three purposes, one segment is involved in control of external devices when used in this mode it bypasses the internal ROM. All instruction for handling any and all external devices in the system are resident in the external ROM. It also contains instructions for sharing the microprocessor if the microprocessor is being used for both activities due to a failure of the other microprocessor in module A or identically in module B.

This ROM also contains all instruction which relates to methodology of switching microprocessors and control instructions as well as setting the conditions for retry, and for determining a module switch if necessary.

Figure 4:
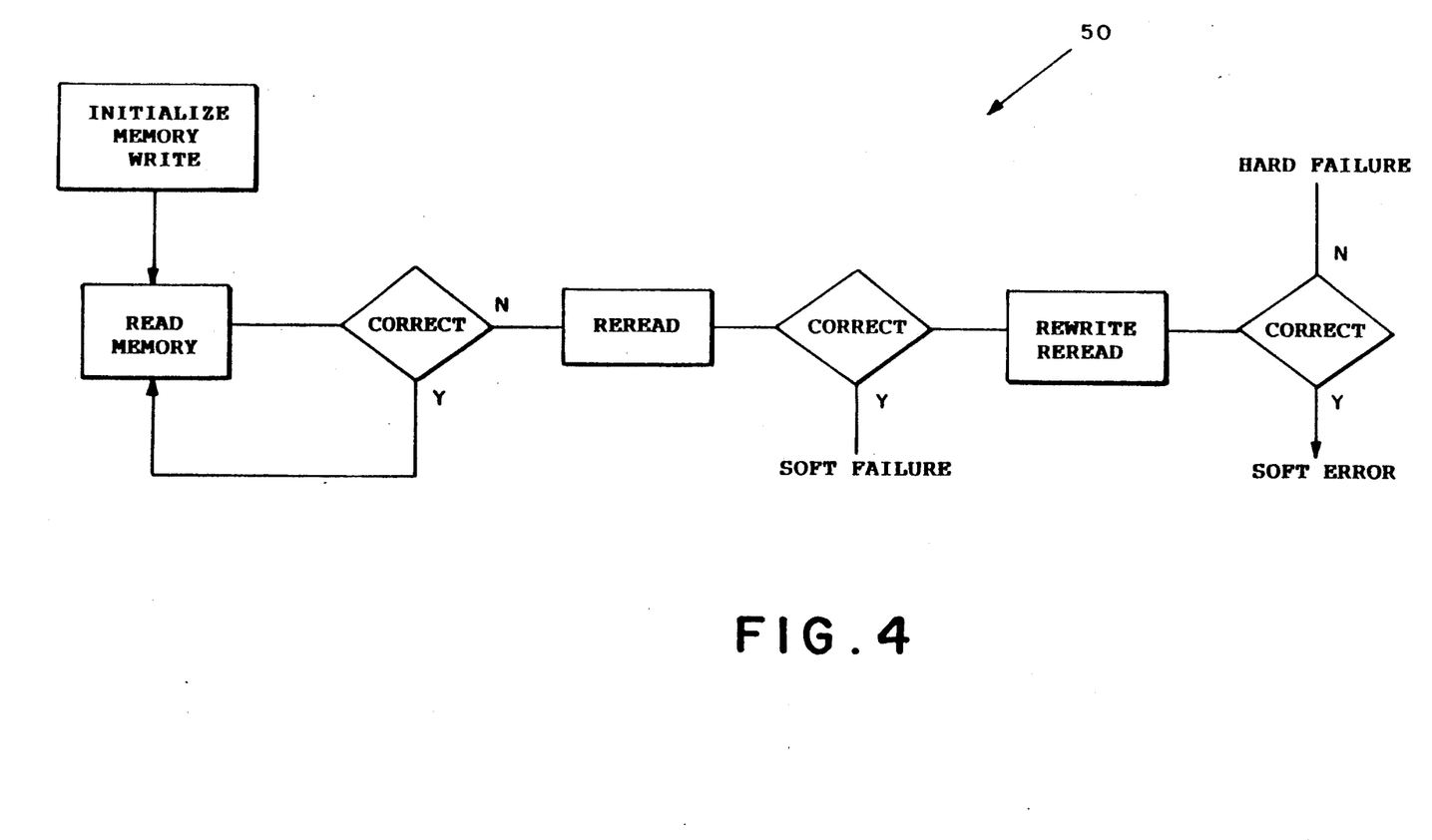
FIG. 4 is a flow chart of an error detection routine for use with the dual redundant electronic postage meter of the present invention.

A retry system as shown in FIG. 4 is incorporated to assure we have not responded to a strictly transient conditions. This is a real time system. Each transaction is verified before print and stored in NVM. The data integrity is checked again before the next arithmetic process.

The sequence indicated in FIG. 4 allows the determination of a problem in the microprocessor and whether it is a soft or hard failure. It provides a mechanism to determine if it is in the BAMs which one of microprocessor's and whether this is a hard or soft failure.

This process defines the need for a switch whether it is a microprocessor switch or a module switch. This is done as a consequence of loss of data integrity in one of the BAMs or malfunction of the microprocessor related to data integrity or incorrect instruction sequencing.

Since the BAMs are battery backup or a ROM type, a momentary loss of power due to a power supply failure or line problems does not cause the loss of data from the last transaction. Total operation history is updated on a power down sequence detected at the microprocessor. It will trigger a total memory operation if power to the microprocessor is maintained. If not, operation history could be lost (partially). However, since all parts are CMOS, a separate battery backup to the microprocessor will simplify the power controls necessary to the system and because of its redundance increase reliability and guarantee total transfer.

The CMOS arrays 14A and 14B are electrically coupled to print head drivers, sensor-buffers and the power supply represented by numeral 26 for actuation of the stepper motors and sensors (not shown). Advantageously, a fan 26 as shown in FIG. 1 may be employed to cool the CMOS devices of the meter 10 to aid in preventing latch-up. Cooling of module itself is also possible in package cooling.

In order to allow for activation of the second meter module 12B and further minimize fund loss, the second meter module memories can be updated with regard to its contents at power down or switch. The dual redundant memory means of the second meter module 12B is coupled to the output memory means of the first meter module 12A to allow this event to occur. Since both meter modules are on battery backup power as regards memory devices this process can be initiated at power down or during a switching operation. It would require no additional power maintenance procedures.

Advantageously, if one of the modules 12A or 12B is or becomes defective the module 12A or 12B may be readily replaced at the customer facility by a service representative without affecting information stored.

Figure 2:
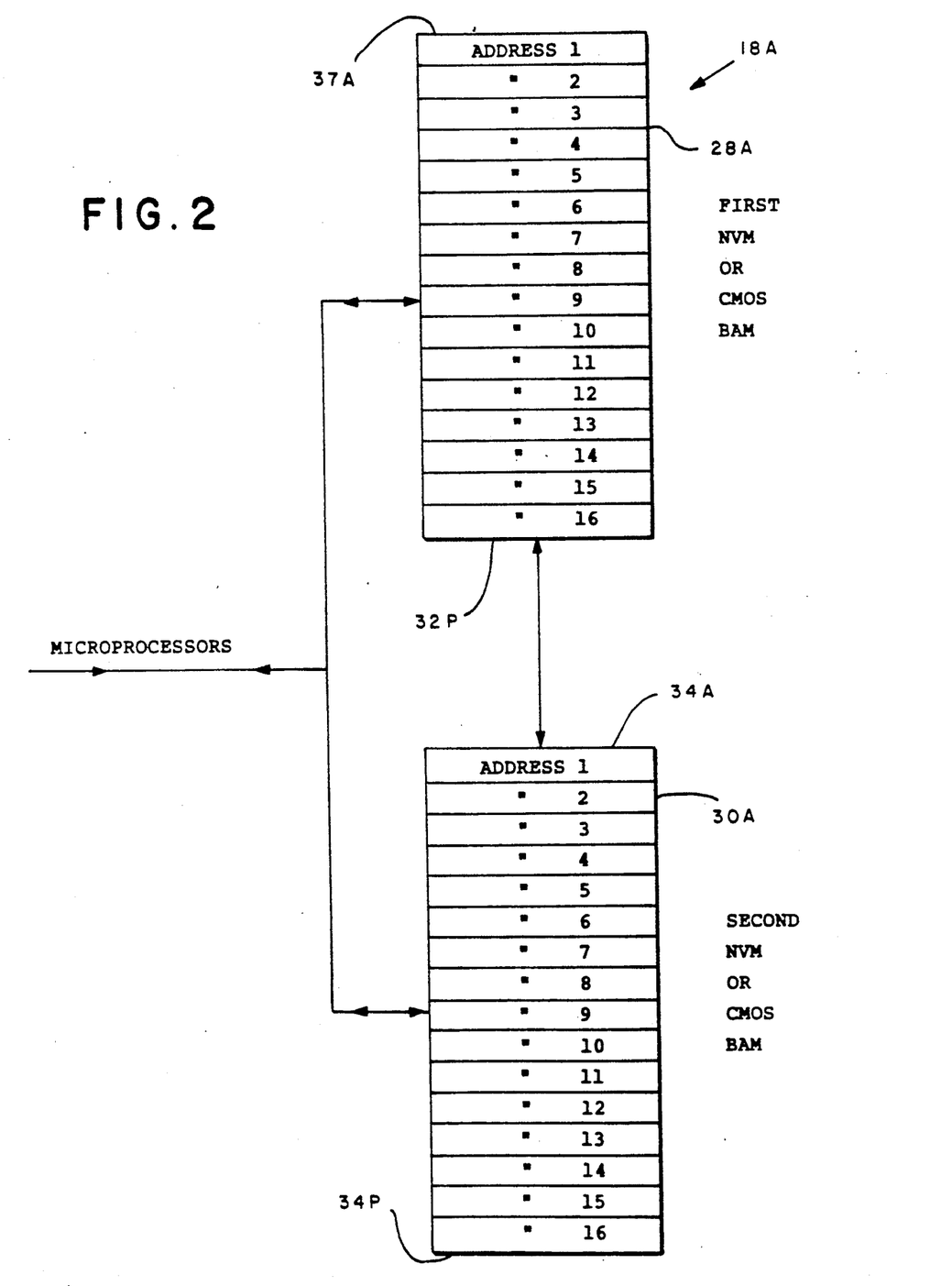
FIG. 2 is an enlarged view of the dual redundant memories segmented to provide various data storage addresses.

Referring to FIG. 2, the dual redundant memory 18A is illustrated including a first NVM or CMOS BAM 28A and a second NVM or CMOS BAM 30A. It should be understood that the redundant memory 18B is identical. The first and second NVMs 28A and 30A are battery augmented memories (BAMs) to provide real time control of accounting accuracy for data recording. Further, each memory address 32A-32P and 34A-34P is alternate with respect to the other memory address to provide increased data integrity and minimum interferences. It is organized on a byte basis to increase speed by providing data transfer with a single instruction. However, it should be understood that NVMs or CMOS BAMs 28A and 30A have an identical architecture and have identical data stored therein so that accuracy checks between BAMs can be made. Both NVMs are in operation to allow triple redundancy techniques to operate. Likewise with the dual redundant memory 18B.

Figure 3:
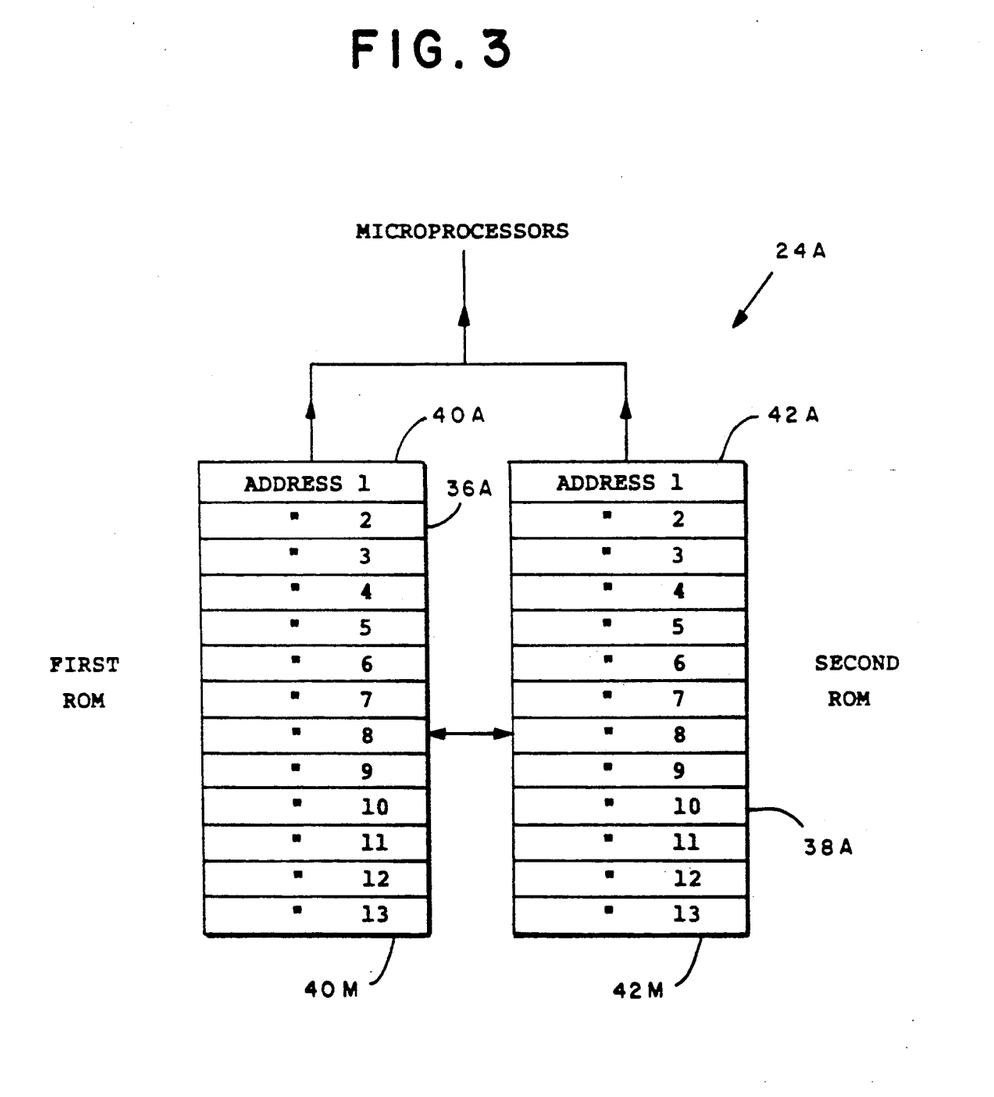
FIG. 3 is an enlarged view of the dual segmented ROMs, segmented to provide various data storage addresses.

Referring to FIG. 3, the dual ROM 24A is illustrated including first ROM 36A and second ROM 38A. It should be understood that the dual ROM 24B is identical. The ROMs 36A and 38A are preferably CMOS ROMs and may be EPROMs or EAROMs, as desired. Each address 40A-40M and 42A-42M is segmented from the other memory addresses to provide error detection based on events and location and allow for I/O control as well as real time transaction error detection action. Further, retry (recover) and switch (device) flags, instructions may be stored in the segmented addresses 40A-40M and 42A-42M of ROMS 36A and 38A, respectively, as desired, to facilitate error detection define actions. If one ROM 36A or 38A fails the other ROM 36A or 38A is placed in operation. Likewise with the dual ROM 24B.

The detection, localizing, error correction programs for the meter stored in the dual ROMs 24A and 24B, provide for errors that are detected based on a sequence of certain events, defined conditions which guarantee accuracy in the total amount of the meter postage used to date (AR) and the total amount of postage remaining in the meter for use (DR). Data stored in RAM relating to an accounting transaction during meter operation is written into suitable address in redundant memory on a transaction by transaction basis allowing for triple redundancy for decision making to occur. At power down, both the last transaction and relevant historical information is transferred to NVM or BAM. At power up the last relevant state of the system is written back into RAM (up).

Triple redundancy is employed for each decision. Once a decision is made, a simple technique based on event is used under control of the program in the dual ROMs 24A and 24B to achieve correction or switch.

The control sum for the meter which represents the sum of AR and DR is verified by a subroutine either stored in the dual ROMs 24A and 24B and is checked once during power up/power down before normal operation begins. While the meter is in operation —power on, data verification on a a transaction by transaction basis allows triple redundancy techniques to be used to detect, locate, define and correct errors and modify relevant component usage within the module and between modules used of A or B.

Advantageously, sensors, e.g., data integrity checks, in the form of photocells, are positioned adjacent to the printwheels to verify the mechanical position thereof.

Referring to FIG. 4, a flow chart is generally illustrated at 50 demonstrating a method of defining type as well as correcting errors in meter operation. Three possible failure/error events can occur and must be detected during the reading of data from memory. These failures/errors are defined as follows:

Hard Failure: A physically impaired or defective component which requires the meter to immediately enter the power down cycle, if data integrity is in question, can signal a need to switch the internal microprocessor based on decision loop or module depending on device failure.

Soft Failure: Data is incorrectly read due to external conditions. This may be caused by transients such as noise or similar system problems brought on by environment (temperature, voltage stress, mailing machine interactions, etc., power-down, and marginal I/O signal.

Soft Error: The data error is internal to a component (malfunction). The error is corrected (memory-based) by rewriting the data in RAM or device in question.

Figure 5:
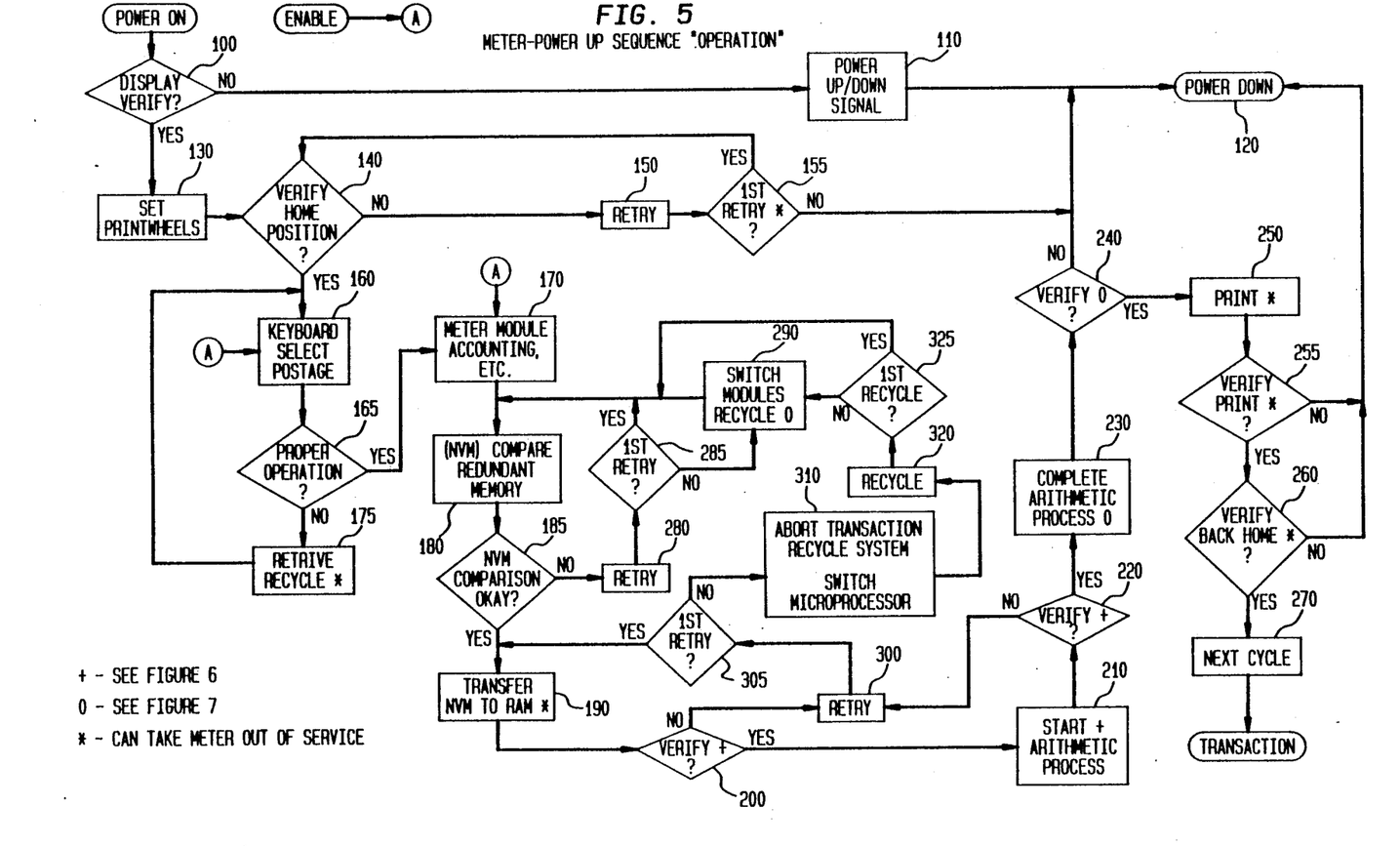
FIGS. 5-7 are further flow charts helpful to understanding the invention.
Figure 6:
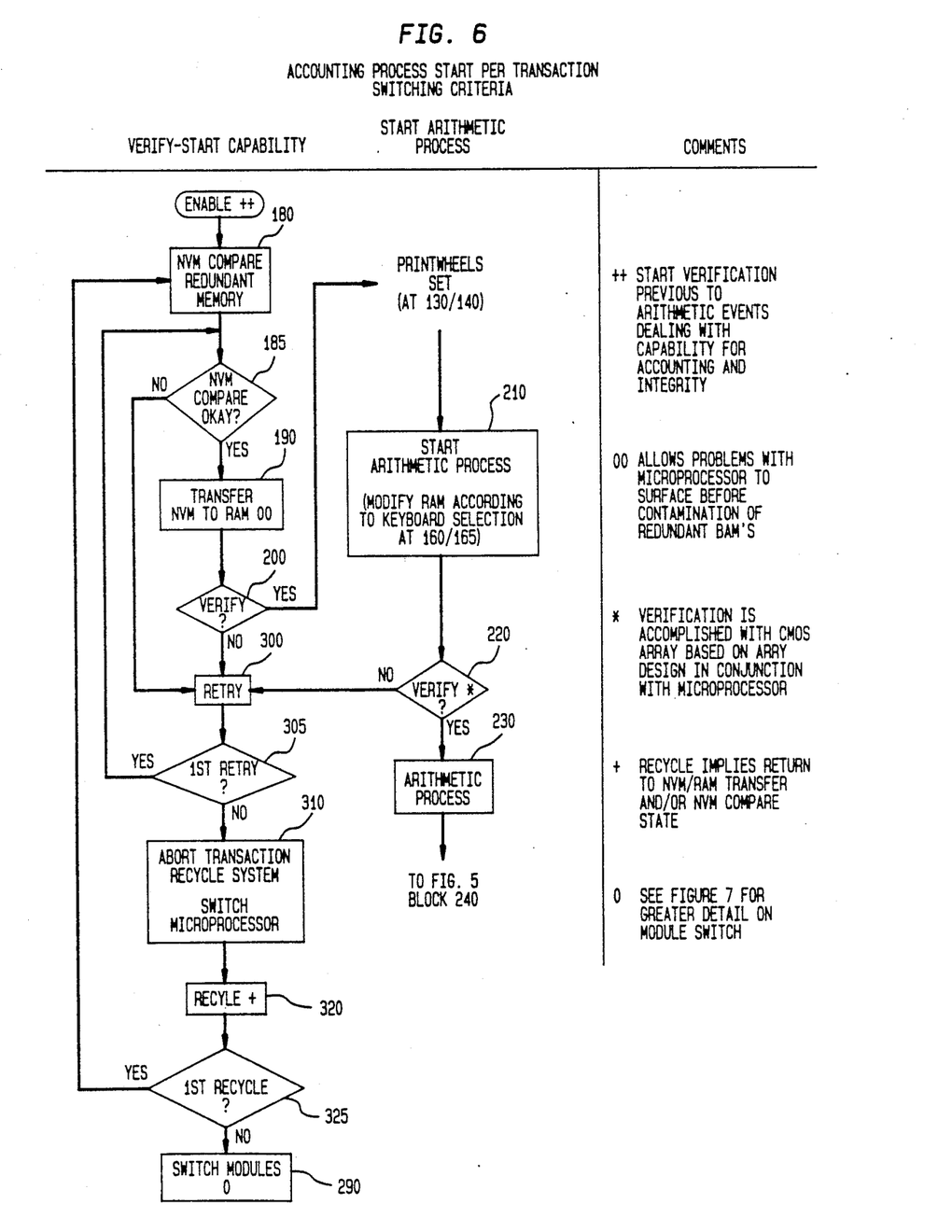
Figure 7:
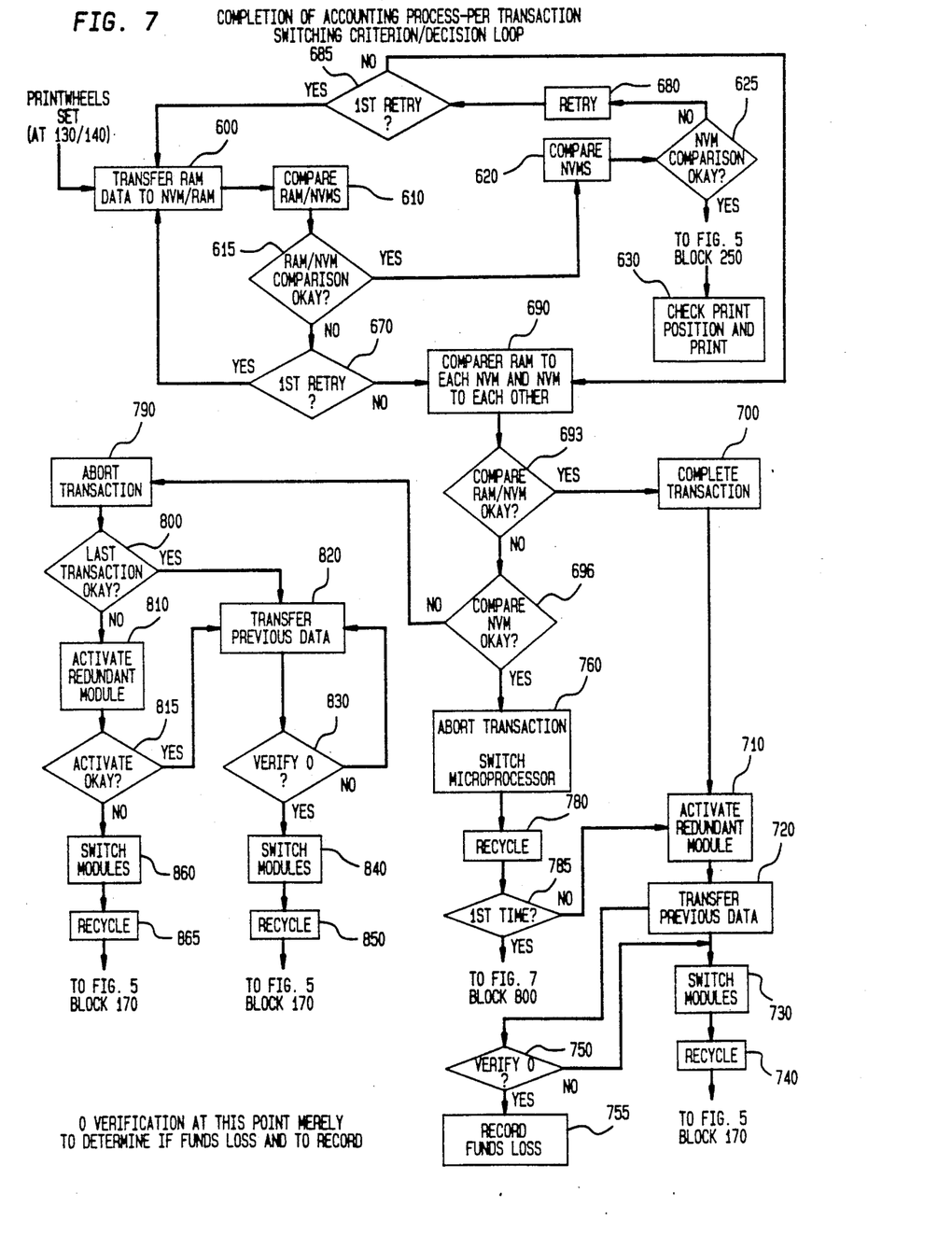

Specifically, referring to the flow chart 50 or FIG. 4, initially, the microprocessor 16A or 16B, under control of the programs in the dual ROMs 24A or 24B, initiates a memory write sequence for writing data in selected memory addresses of the RAMs of the microprocessors 16A and 20A or 16B and 20B. After data is written in the selected addresses, the memories are read. If the data is correct, the microprocessor 16A or 16B goes to the next operation. However, if the data is not correct the memory address is reread. If the data is now correct, a soft failure is diagnosed. If the data is still incorrect, the memory address is read a third time. If the data is now correct, a soft error is diagnosed. If the data is still incorrect, a hard failure is diagnosed and localized to the component, i.e., microprocessor or redundant memories which one. A switch to redundant microprocessor internal to module is made. FIG. 5-7 Verification of operation is made and transaction completed. If one of the NVMs (BAMs) dual redundant memories 18A and 18B are incorrect it is disabled, transaction completed and then the module is switched. The system only powers down if an error is detected during the accounting process, depending on whether that specific event is retryable, or if a decision based on two correct out of three can not be made. At that point, the second module is switched on operational verified and resumes meter operation. It will also power down if the sensors, printer, etc., is jammed or not operational independent of the accounting function. This process is controlled by the CMOS array.

By providing dual meter modules 12A and 12B with dual redundant memories 18A and 18B, and dual ROMs 24A and 24B, an entire back-up meter module is provided as well as back-up components within each meter module, 12A and 12B, this will regardless of errors in some of the system components minimize meter returns as result of malfunction, increase serviceability, as well as substantially eliminate any loss of funds. If a Soft Error is detected in a particular memory location, the malfunctioning component is deactivated and its dual redundant counterpart is activated if not already operational.

In operation, the meter is powered-up by actuating a switch (not shown) which enables an external power supply (not shown) to supply energy to the meter modules 12A and 12B. As a result of the programs or sets of data instructions stored in the dual ROMs 24A and 24B, a check sum routine is initiated to check the control sum.

Thereafter, the meter begins operation with the accounting data previously stored in the redundant memories 18A and 18B being read into the RAMs associated with the CMOS microprocessors 16A and 20A, and 16B and 20B. The display, e.g., which may be in the form of LEDs, is actuated by the CMOS arrays 14A and 14B in response to data entered through the keyboard (not shown). The accounting data for each postal operation of the meter is stored in the RAM associated with the microprocessor 14A or 16A, or 14B or 16B. Additionally, the outputs from the CMOS arrays 14A or 14B are applied to printhead drivers to actuate the stepper motors and sensors for the printwheels.

External devices interact with the meter under control of the CMOS microprocessors 20A or 20B through the opto-isolator 22A or 22B. The dual ROMs 24A and 24B supply sets of data instructions to the CMOS microprocessors 16A and 20A and 16B and 20B, respectively, in accordance with the desired operation of the meter related to I/O and data integrity actions. The internal ROM of 16A/20A 16B/20B provides instruction relating to normal operation of the meter.

The redundant memories 18A and 18B receive and store data permanently when the meter undergoes a power down cycle prior to deactiviting the meter 10.

In FIGS. 5-7, the decisional making process for determining proper operation is shown in greater detail. FIG. 5 shows the meter and power-up sequence operations. As power is applied, the display is verified at decision block 100 and if there is no verification the power-up down signal is given leading at block 110 to power-down at block 120.

If the display verification checks okay, the print wheels are set block 130, and the positioning verified decision block 140. If there is no verification, the retry block 150 is exercised and checked, decision block 155, and if the retry is unsuccessful, the meter is powered down at block 120.

Returning to block 140, the keyboard selection is then enabled and selected, block 160. Proper operation is checked at decision block 165. If improper operation is determined at decision block 165, the retry block 175 is executed as described below to cause a recycling to block 160 for keyboard selection.

In the event that the printwheels have been properly set and the keyboard properly enabled, the meter module accounting is enabled at 170, the NVMs are compared, block 180, tested at NVM comparison decision block 185, and if correct, the transfer is made of the data in the NVM to RAM at block 190. Results are verified at decision block 200 and if everything is correct, the arithmetic process is started block 210. It should be noted at this point that the YES branch of the verification from decision block 140 is also required for the start of the arithmetic process to occur. The operations are verified at decision block 220 and if correct, the YES branch leads to complete the arithmetic process at block 230. The operation is again checked at decision block 240 and if there is a discrepancy, the NO branch causes a flag or similar indication that the meter is to be taken out of service. In the event that the verification is correct, the YES branch proceeds to print block 250. The printing is verified at decision block 255, and decision block 260 to detect whether the meter has come back to home position, and if correct, block 270, the cycle is completed and the next transaction is awaited. If the print is not correctly made or the meter fails to return to its home position, the NO branches lead to the power-down block 120.

Returning to block 185 where the non-volatile memories are compared, in the event that the comparison is not correct, the NO branch falls to a retry block 280 and if again incorrect upon retry, decision block 285 a switch-module signal, block 290, switches the modules and causes the non-volatile memories to again be compared at block 180.

Verification at decision block 200 and decision 220 which result in incorrect verifications leads to a retry block 300 and in the event the retry is unsuccessful, decision block 305 the transacting recycle system is aborted and microprocessor is switched at block 310, the meter is recycled at block 320 and checked at decision block 325. If the result of the recycling at 325 fails, the NO branch leads to the switch modules block 290.

It will be understood that the "plus" sign in conjunction with the verification is described more completely in the FIG. 6 and the small circle of the switch modules block is described more fully in FIG. 7.

FIG. 6 more particularly describes the switching criteria in the accounting process for the start of each transaction. As described in conjunction with FIG. 5, the enable signal is provided and the non-volatile memories are compared, block 180, and if the comparison is okay, decision block 185, there is a transfer of data from the non-volatile memory to RAM 190 and the data is again compared, block 200. If either decision block 185 or decision block 200 results in a comparison that is incorrect, there is a retry, block 300, a decision block 305 and the data is again compared, block 185 and verified at block 200. The YES branch of decision block 200 leads to the printwheels being set as shown previously in FIG. 5 whereupon the arithmetic process begins and the RAM is modified according to the keyboard selection data, block 210. If the retry is unsuccessful, block 305 the transaction recycle system is aborted and the microprocessor switched at block 310 and a recycle retry attempted again at block 320. If the final recycle still shows error, at decision block 325 the modules are switched at block 290.

The start of the arithmetic process requires that the print wheels are set, as shown previously in FIG. 5, which allows the RAM to be modified in accordance with the selection and also enables the completion process, block 210, described in FIG. 7. A verification against the selection is performed block 220 which is also necessary as an input for completion of the arithmetic process, block 230 and FIG. 5, block 240. If the verification is NO, a recycle is called, block 300, and the transaction recycle is aborted and, the microprocessors are switched at block 310; recycle retry is attempted at block 320; decision block 325 and modules are switched at block 290.

FIG. 7 shows the verification of the accounting process for the transaction cited in FIG. 5 as decision block 240. Again, the print wheels are set as shown previously in FIG. 5. The data is transferred from the RAM to NVM, block 600. The data in RAM is compared to that in the non-volatile memories, block 610, decision block 615, and if correct, each non-volatile memory is then compared to each other at block 620, decision block 625. If the outcome is favorable, at 625 a signal is sent to print, box 630. If required, at 630, a print recycle can be performed.

Returning to decision block 615, in the event that the non-volatile memory data does not compare properly to that in the RAM, there is a retry of the transfer, block 670, and the RAM is again compared to non-volatile memory at 610. Similarly, when the non-volatile memories are compared to each other, at block 625, if the non-volatile memories do not compare properly to each other, the NO branch leads to retry the transfer again at block 680 and decision block 685. If the outcome of any of these retry attempts is NO, the program falls to block 690 to compare the RAM to each non-volatile memory and the non-volatile memory to each other.

If the comparison between the RAM and non-volatile memory decision block 693 is correct, the transaction is completed, block 700 (i.e., incremental funds have been debited DR). The redundant module is activated, block 710, because of soft error detected at decision block 693, and the previous data transferred, block 720. The modules are switched at block 730 and recycle is attempted at block 740 proceeding to FIG. 5, block 170. Preferably, the verification is made at decision block 750 to determine if funds were lost and to record the result, block 755. If funds were determined to have not been lost, the program continues to switch modules, block 730.

In the event that comparison at decision block 693 results in a NO between the RAM and NVM's, the program falls to decision block 696 and a YES comparison between the NVM's causes the transaction to be aborted and the microprocessor is switched, block 760, and recycling attempted at block 780 proceeding to FIG. 7, block 600. If recycle does not occur, decision block 785, the program falls to activate redundant module, block 710.

Finally, if none of the RAM or NVM 1 or 2 compare to each other in decision block 696, the transaction is aborted at block 790 and the last transaction compared at decision block 800. If this comparison is not successful, the redundant module is activated, block 810 and if YES for either of the comparison of the last transaction block 800, or after the activation of the second module, decision block 815, the data is transferred, block 820, verified at decision block 830 and the module switched, block 840 and recycled, block 850, continuing back to FIG. 5, block 170. If verification of data transfer is incorrect, the program continues to block 820, transfer previous data.

Returning again to the actuation of module 2 at block 810, if NO, the module is switched at decision block recycled, block 850, continuing back to FIG. 5, block 170.

It should be understood by those skilled in the art that various modifications may be made in the present invention without departing from the spirit and scope thereof, as described in the specification and defined in the appended claims.

What is claimed is:

1. A dual redundant electronic postage meter for increasing the reliability of an electronic postage meter, comprising:
a first meter module including dual redundant memory means for receiving and for storing postage accounting data and operational data and dual redundant microprocessor means for operating said first meter module;
a second meter module including dual redundant memory means for receiving and storing postage accounting data and operational data and dual redundant microprocessor means for operating said second meter module;
said dual redundant microprocessor means of said first meter module communicating with a data entry means for receiving data processed by said first meter module and external output means for communicating postage accounting data and operational data of said first meter module; and
said dual redundant microprocessor means of said second meter module communicating with the data entry means for receiving data processed by said second meter module and the external output means for communicating postage accounting data and operational data of said second meter module, said dual redundant microprocessor means of said second meter module being activated in response to said first meter module.

2. The dual redundant electronic postage meter recited in claim 1, wherein:

said first and second meter modules are programmed to undergo triple redundancy checking prior to arriving at a decision.

3. The dual redundant electronic postage meter recited in claim 1, wherein:
said first and second meter modules are programmed to undergo triple redundancy checking prior to arriving at an accounting decision.

4. The dual redundant electronic postage meter recited in claim 1, wherein:
said dual redundant memory means of said first and second meter modules include battery augmented memories.

5. The dual redundant electronic postage meter recited in claim 1, wherein:
said dual redundant memory means of said first and second meter modules are organized to receive and store data on a byte basis.

6. The dual redundant electronic postage meter recited in claim 1, wherein:
said dual redundant memory means of said first and second meter means are segmented with memory addresses for storage of data corresponding to retry and switch flags.

7. The dual redundant electronic postage meter recited in claim 1, including:
cooling means for cooling said first and second meter modules.

8. The dual redundant electronic postage meter recited in claim 1, wherein:
said dual redundant microprocessor means include CMOS devices; and
said dual redundant memory means include CMOS devices.

9. The dual redundant electronic postage meter recited in claim 1, wherein:
said redundant memory means include a memory address for storing data corresponding to a flag for address partitioning said dual redundant memory means.

10. The dual redundant electronic postage meter recited in claim 1, further including:
a first dual segmented ROM for said first meter module; and
a second dual segmented ROM for said second meter module.

11. The dual redundant electronic postage meter recited in claim 10, wherein:
said dual segmented ROMs include a first series of data instructions for determining a hard failure, a second series of data instructions for determining a soft failure and a third series of data instructions for determining a soft error.

12. The dual redundant electronic postage meter recited in claim 1, wherein:
said each respective one of dual redundant memory means of said first and second meter means includes first address means for storing data representing an amount of postage previously used by the meter (AR), second address means for storing data representing an amount of postage remaining in the meter for use (DR), and third address means for storing data representing a sum of AR and DR, which is designated as a control sum.

13. The dual redundant electronic postage meter recited in claim 12 wherein:
the control sum may be retrieved from at least one of said dual redundant memory means upon request of at least one of said dual redundant microprocessor means.

14. The dual redundant electronic postage meter recited in claim 12 wherein:
said at least one of said dual redundant microprocessor means access said third address means to retrieve the control sum only during power-up of the meter.

15. A method for increasing the reliability of an electronic postage meter by redundancy, comprising the steps of:
providing a first meter module with dual redundant memory means for receiving and storing postage accounting data and operational data and dual redundant microprocessor means for operating said first meter module;
providing a second meter module with dual redundant memory means for receiving and storing postage accounting data and operational data and dual redundant microprocessor means for operating said second meter module;
connecting said first and second meter modules to a data entry means for receiving data processed by said first and second meter modules and external output means for communicating operational results of said first and second meter modules; and
undertaking redundant decisional operations in response to data inputted into the data entry means during operational conditions.

16. The method recited in claim 15, wherein:
the undertaking step includes triple redundancy checking for arriving at a decision.

17. The method recited in claim 15, including the step of:
using triple redundancy for arriving at an accounting decision.

18. The method recited in claim 15, including the steps of:
coupling printhead driver means to the first and second meter modules;
coupling the printhead driver means to stepper motors which are mechanically coupled to print wheels; and
positioning sensor means proximate to the print wheels for verifying positional accuracy of the print wheels.

19. The method recited in claim 15, further including the step of:
providing real time control of meter accounting decisions.

20. The method recited in claim 15, further including the step of:
organizing each of said dual redundant memory means to receive and store data on a byte basis.

21. The method recited in claim 15, further including the step of:
segmenting each of said dual redundant memory means with memory addresses for storage of data corresponding to retry and switch flags.

22. The method recited in claim 15, further including the step of:
cooling the first and second meter modules.

23. The method recited in claim 15, further including the step of:
storing data in each of the dual redundant memory means corresponding to a flag which address respectively partitions the respective dual redundant memory means.

24. The method recited in claim 15, further including in the step of:
  deactivating the first meter module and activating the second meter module upon detection of an error in the first meter module.

25. The method recited in claim 15, further including the steps of:
  providing a first dual segmented ROM for the first meter module; and
  providing a second dual segmented ROM for the second meter module.

26. The method recited in claim 25, further including the steps of:
  providing a first series of data instructions in the dual segmented ROMs for determining a hard failure of the meter;
  providing a second series of data instructions in the dual segmented ROMs for determining a soft failure of the meter; and
  providing a third series of data instructions in the dual segmented ROMs for determining a soft error of the meter.

27. The method recited in claim 15, further including the steps of:
  providing a first address in each of the dual redundant memory means for storing data representing an amount of postage previously used by the meter (AR);
  providing a second address in each of the dual redundant memory means for storing data representing an amount of postage remaining in the meter for use (DR); and
  providing a third address in each of the dual redundant memory means for storing data representing a sum of AR and DR, which is designated as a control sum.

28. The method recited in claim 27, further including the step of:
  retrieving control sum data stored at said third address from at least one of the dual redundant memory means upon request of one of said dual redundant microprocessor means.

29. The method recited in claim 27, further including the step of:
  accessing the third address in at least one of the dual redundant memory means to retrieve the control sum only during power-up of the postage meter.

30. A method for increasing the reliability of an electronic postage meter, comprising the steps of:
  providing a first meter module having first dual redundant memory means for receiving and storing postage accounting data and operational data and first dual redundant microprocessor means for operating said first meter module;
  providing a second meter module having second dual redundant memory means for receiving and storing accounting data and operational data and second dual redundant microprocessor means for operating said second meter module;
  connecting said first and second meter modules to a data entry means for receiving data processed by said first and second meter modules and external output means for communicating operational results of said first and second meter modules;
  providing triple redundant decisional operations in response to data inputted into the data entry means;
  using triple redundancy for arriving at each accounting decision;
  connecting printhead driver means to the first and second meter modules;
  providing real time control of the meter accounting decisions;
  organizing said first and second dual redundant memory means to receive and store data on a byte basis;
  segmenting said first and second dual redundant memory means with memory addresses for storage of data corresponding to retry and switch flags;
  providing a first dual segmented ROM for the first meter module;
  providing a second dual segmented ROM for the second meter module;
  cooling the first and second meter modules;
  providing a first address in each respective dual redundant memory means for storing data representing an amount of postage previously used by the meter (AR);
  providing a second address in each respective dual redundant memory means for storing data representing the amount of postage remaining in the meter for use (DR);
  providing a third address in each respective dual redundant memory means for storing data representing the sum of AR and DR, which is designated as the control sum;
  storing data in each said dual redundant memory means corresponding to a flag which address partitions the respective dual redundant memory means;
  providing a first series of data instructions in said first and second dual segmented ROMs for determining a hard failure of the meter;
  providing a second series of data instructions in said first and second dual segmented ROMs for determining a soft failure of the meter; and
  providing a third series of data instructions in said first and second dual segmented ROMs for determining a soft error of the meter, whereby the reliability of the electronic postage meter is increased.

31. The method recited in claim 30, further including the step of:
  retrieving the control sum from at least one of the dual redundant memory means upon request of one of the dual redundant microprocessor means.

32. The method recited in claim 30, further including the step of:
  accessing the third address to retrieve the control sum only during power-up of the postage meter.

33. The method recited in claim 30, further including the step of:
  deactivating the first meter module and activating the second meter module upon detection of an error in the first meter module.

* * * * *